No. 844,255. PATENTED FEB. 12, 1907.
H. H. CRAMER.
VALVE.
APPLICATION FILED DEC. 7, 1903.
2 SHEETS—SHEET 2.
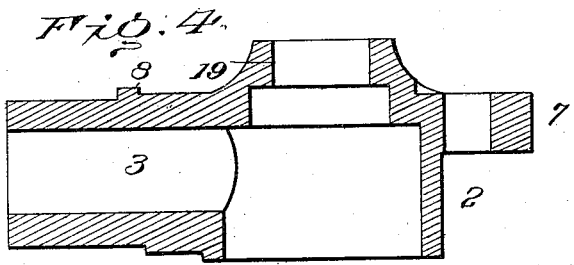
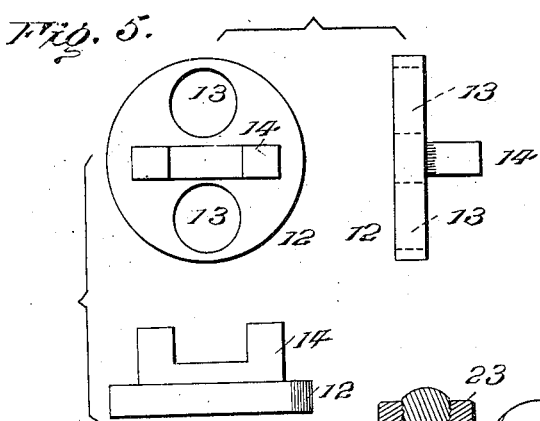
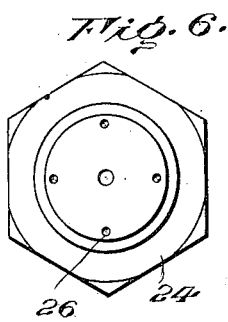
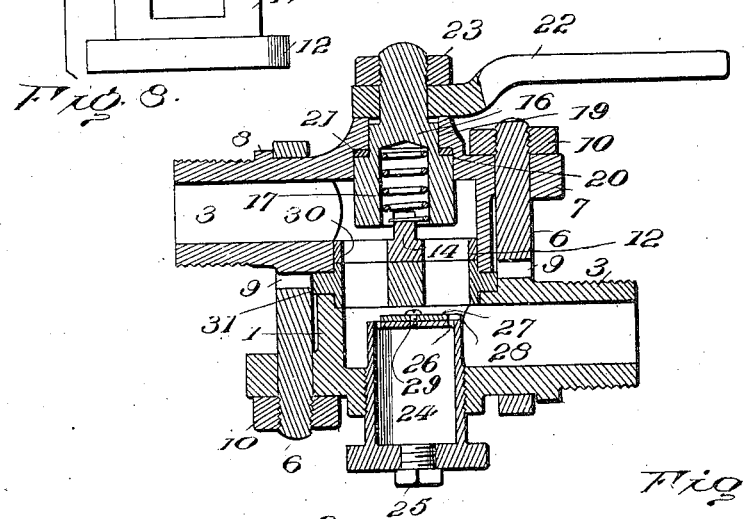
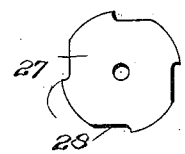
Witnesses
Inventor
Herbert H. Cramer.
By
Attorney

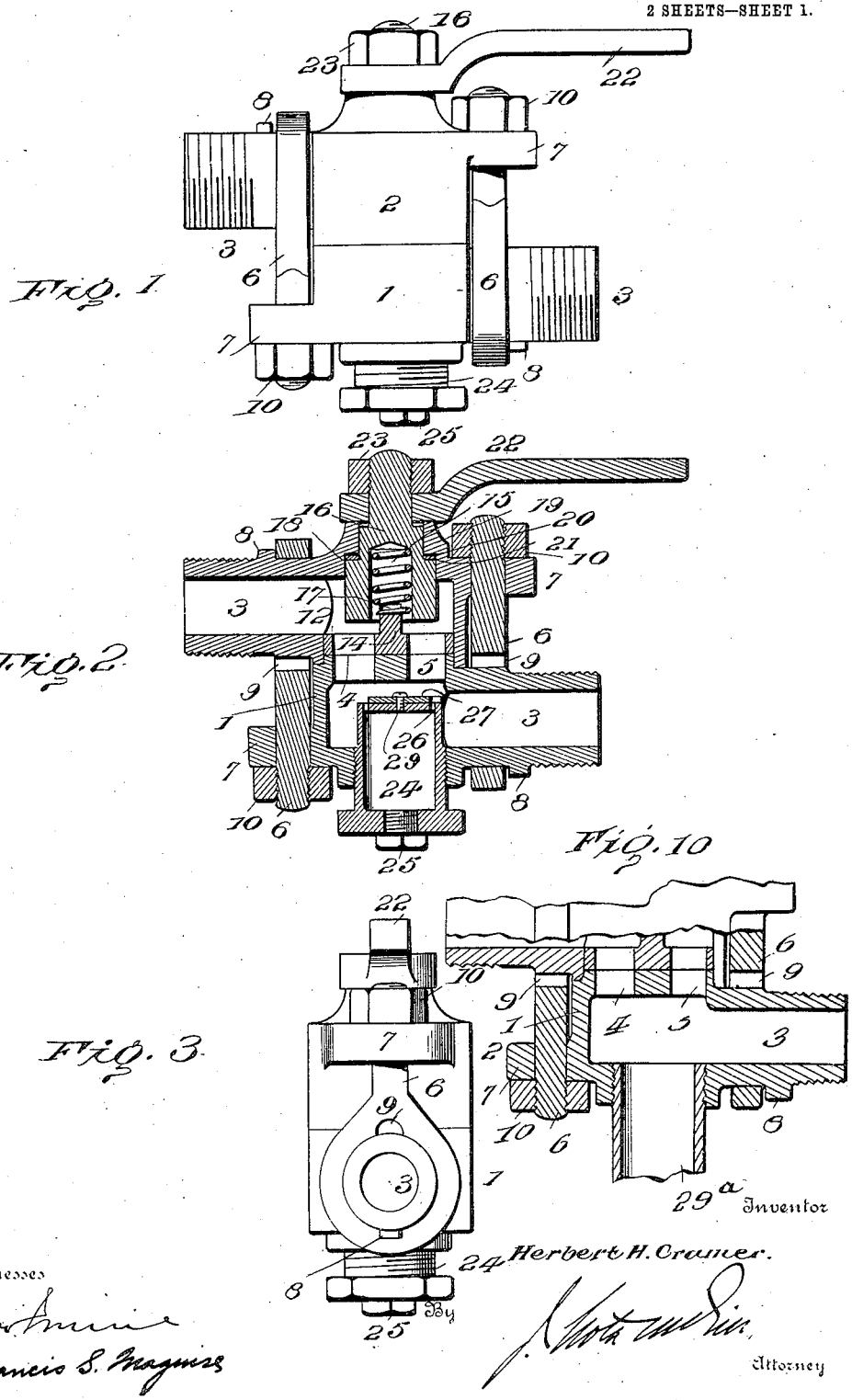

UNITED STATES PATENT OFFICE.

HERBERT H. CRAMER, OF ASPEN, COLORADO.

VALVE.

No. 844,255.   Specification of Letters Patent.   Patented Feb. 12, 1907.

Application filed December 7, 1903. Serial No. 184,131.

*To all whom it may concern:*

Be it known that I, HERBERT H. CRAMER, of Aspen, in the county of Pitkin and State of Colorado, have invented certain new and useful Improvements in Valves; and I do hereby declare the following to be a full, clear, and exact description of the invention, such as will enable others skilled in the art to which it appertains to make and use the same.

The objects of this invention are to so construct the casing of an air-valve that in the event of injury to a part thereof the same may be readily replaced without loss of the other part or parts; to provide an air-valve wherein the inlet and outlet, while parallel, are not on the same plane or in direct line, so that the valve-disk may be readily and easily operated; to so form the valve-seat that it may be readily filed in the event of becoming worn; to enable the employment of means both simple and inexpensive for securing together the parts of the valve-casing; to enable the valve to be used for right-angular connections when necessary, and, finally, to prevent the valve-casing from working loose in its connection to a rigid pipe by reason of the turning of the valve-disk.

The invention will be hereinafter fully set forth, and particularly pointed out in the claims.

In the accompanying drawings, Figure 1 is a side elevation. Fig. 2 is a vertical longitudinal sectional view. Fig. 3 is an end view. Fig. 4 is a view of one of the casing-sections detached. Fig. 5 shows face and edge views of the valve-disk. Fig. 6 is an end view of the oil-reservoir. Fig. 7 is a face view of the controller of such reservoir. Figs. 8 and 9 show a slight modification. Fig. 10 shows the valve-casing mounted on a pipe.

Referring to the drawings, 1 and 2 designate the two parts or sections of the valve-casing, each having a cylindrical body portion and a lateral branch 3, one branch serving as the inlet and the other as the outlet. These branches, although parallel, are not on the same plane or in direct line with each other. The upper edge of the cylindrical body of part 1 is raised to form a valve-seat 4, which projects into the end of the cylindrical body of part 2. The seat 4 is formed with a diaphragm equipped with ports or openings 5 on opposite sides of the center. By thus forming the valve-seat above the body proper it may be readily filed down in the event of wear. The two body parts are secured together by two eyebolts 6, the eye of each bolt encircling one of the branches 3, while its threaded end is extended through an apertured flange 7 of the other body part. Each of these branches is exteriorly threaded at its outer end, while at the meeting-points with the inner portions, which are of slightly greater diameter, are lugs 8, serving to prevent the eyebolts when in position from moving outwardly, save when a bolt is inverted, and a recess 9 in its circular portion is in alinement with such lug. The bolts are thus positioned when being placed on or removed from the branches. Thus it will be seen that the two parts of the valve-casing are firmly secured together by the eyebolts without in any way impairing the strength of the casing, and at the same time the bolts do not interfere with free passage through the casing and its branches. The bolts are equipped with binding-nuts 10, by loosening which the two parts of the casing may be readily separated.

12 is the valve-disk, having two ports 13 corresponding to those of the valve-seat, and between these ports projects from the face of the disk a rib 14, the central portion of which is cut out to accommodate a spiral spring 15, located within the tubular body of the valve-stem 16. This stem is formed with a transverse slot 17 to accommodate rib 14 and insure the turning of the disk by the stem. The disk is tightly held against its seat by the spring 15, which spring may be of considerable capacity because of the space allowed therefor between the end of the bore of the valve-stem and the cut-out of rib 14. Between the shoulder 18 on the exterior of the stem (which shoulder is formed by the reduced neck 19) and an overhanging flange 20 of the body part 2 is placed a packing-ring 21. Thus the stem is packed from within, and owing to the internal pressure the tendency is to increase the fit of the stem against the packing, thereby preventing any escape of air. The stem projects through an opening surrounded by the overhanging flange, being inserted upwardly therethrough, and is equipped with handle 22. The binding-nut 23 not only retains the handle in place, but holds the shoulder and packing-ring tight up to the overhanging flange.

Extending into the cylindrical body of part 1 is an oil-reservoir 24, located eccentrically to both the body and the valve-disk. This reservoir is shown in the form of an exteriorly-threaded cup screwed into an opening in part 1 and equipped in the outer end with a threaded supply-opening normally closed by a plug 25, the outer flange of such cup being squared to permit of the application of a wrench. The inner end plate of the cup is formed adjacent to its periphery with small holes or openings 26, through which the oil may pass into the valve-casing. The outlet of the oil is regulated by a centrally-pivoted disk 27, having in its periphery a series of cut-outs 28. The extent to which this disk is turned on its pivot 29 controls the quantity of oil which may flow from the cup. The opening in which the oil-cup fits is of standard size and thread, so that when it is desired to form right-angular connections with the valve the cup may be removed and a pipe inserted in lieu thereof, the adjacent branch 3 of the valve-casing being plugged or otherwise closed. By reason of the eccentric location of the oil-cup a larger space is formed at one side of such reservoir than if the cup were in the center, the object being to allow oil to accumulate therein when the tool or machine is out of operation. When the air is again turned on, the collected oil at the bottom of the valve-casing will be taken up by the air and forced out more gradually than would occur if it were in a very small space. Furthermore, by reason of the eccentric location of the threaded opening when the casing is secured to a rigid pipe 29ª (see Fig. 10) it is not liable to work loose in the manipulation of the valve, as occurs when the pipe connection is in axial line or concentric with the valve proper. When the casing forms a right-angular connection, the pipe screwed into the threaded opening forms the only rigid connection, a hose being secured to the single open branch.

In Figs. 8 and 9 I have shown the valve-seat 30 as a separate part equipped with opposite straight edges 31, so as to be held in place as against turning by the two eye-bolts. This permits the valve-seat as well as the valve to be made of different material from that of the casing, and as the removable seat is of corresponding formation on its upper and lower sides it may be reversed when one side becomes worn.

From what has been said it will be seen that if one of the parts of the valve-casing is injured—as, for instance, if one of the threaded laterals should be in any way damaged—it is not necessary to throw aside the entire valve, since the parts may be readily separated and the damaged one replaced. The valve-disk being capable of easy turning in case of accident with the tool or machine, the flow of air may be instantly stopped—a fact not always capable of accomplishment with valves now generally employed—in which event the valve-casing will not work loose, the threaded opening not being concentric with the valve-disk or its stem. The placing of the laterals on different planes renders easy the manipulation of the valve-disk. It will also be observed that by means of the oil-reservoir a lubricant may be readily supplied to the tool or machinery and that oil accumulating in the bottom of the valve-casing when the machine is not in operation will be taken up and gradually fed forward when work is resumed. Furthermore, by removing the oiler a right-angular connection may be made.

I claim as my invention—

1. A valve having its casing formed in separate parts or sections, the opposite end sections being provided with lateral branches, which branches are in parallelism, but on different planes, and eyebolts encircling said branches and secured each to the opposite end section.

2. A valve having its casing formed in separate parts or sections, the opposite end sections being provided with lateral branches and apertured flanges, such flange of each section being opposite the branch of the other section, and eyebolts encircling said branches and extended each through the apertured flange of the opposite end section.

3. A valve having its casing formed in separate parts or sections, the opposite end sections being provided with lateral branches and apertured flanges, such flange of each section being opposite the branch of the other section, eyebolts encircling said branches and extended each through the apertured flange of the opposite end section, and means for preventing lateral displacement of such bolts.

4. A valve having its casing formed in separate parts or sections, the opposite end sections being provided with lateral branches, each branch having a lug projecting outwardly therefrom, eyebolts having cut-outs designed to coincide with said lugs in the positioning and removal thereof, said parts or sections having apertured flanges through which said eyebolts are passed, and nuts on such bolts, as set forth.

5. A valve-casing formed in two parts with lateral branches on different planes, the body portion of one part extending into the body portion of the other part and forming a valve-seat, eyebolts encircling said branches and secured each to the opposite part of the valve-casing, and a valve-disk fitted against said seat, as set forth.

6. The combination with the casing formed in two parts, each part having a laterally-extended branch, the two branches forming inlets and outlets in parallelism with each other but on different planes, a valve and seat therefor intermediate the inner ends of said branches, eyebolts encircling the latter and secured to the opposite parts of the casing, and means for turning such valve, as set forth.

7. The combination with the casing composed of two parts, each consisting of a cylindrical body, a lateral branch, and an apertured flange, the branch of one part being opposite the flange of the other part, one of said bodies projecting into the other and forming a valve-seat, eyebolts encircling said branches designed to extend through the apertured flange of the other part, a valve on said seat, and a stem therefor, as set forth.

In testimony whereof I have signed this specification in the presence of two subscribing witnesses.

HERBERT H. CRAMER.

Witnesses:
 H. J. HAGEN,
 FELIPE PIREZ UGARTE.